May 27, 1958   R. K. BOYER   2,836,217
VALVE STEM FOR TUBELESS TIRES
Filed May 10, 1954

INVENTOR.
RALPH K. BOYER
BY
ATTORNEYS

United States Patent Office 2,836,217
Patented May 27, 1958

2,836,217

VALVE STEM FOR TUBELESS TIRES

Ralph K. Boyer, Cleveland, Ohio, assignor to The Dill Manufacturing Company, Cleveland, Ohio, a corporation of Ohio Application May 10, 1954, Serial No. 428,454

3 Claims. (Cl. 152—427)

The present invention relates to a valve which is particularly adapted and intended for use in connection with the rim upon which is mounted a tubeless tire. Valve stems that are to be used in connection with rims upon which are mounted tubeless tires, must, of necessity, have a firm attachment to the rim and the association between the stem and the rim must be of such a nature that it is airtight and remains airtight so long as the valve stem is associated with the rim.

Every rim adapted for mounting of a tubeless tire is supplied with a valve stem opening and the valve stem by some means or other, must be mounted so as to extend toward the center of the rim and be securely mounted in the said opening.

In the present instance the valve stem is principally constructed of rubber or equivalent material, the rubber being provided with portions which will engage the portions of the rim which lie adjacent the periphery of the valve stem hole therethrough, not only upon the outside of the rim, but also upon the inside. It is of course necessary that this binding action incident to the engagement between the rubber of the stem and the metal forming the peripheral portions of the valve stem opening, shall be constant and perpetual as otherwise air will leak around the valve stem and thus diminish the air pressure in the tire and of course the attachment of the stem to the rim must be so secure that the stem will not tear from the rim where the rim and tire are only subjected to the hazards of use.

It is a well-known fact that rubber tends to deteriorate and to lose, at least to some degree, its elasticity or life, after it has been used or exposed to the elements, for a period of time. It is a purpose of the present invention to provide means whereby the resilient gripping action between the portion of the valve stem which extends through the valve stem opening of the rim, shall be maintained, by providing a constant positive means which will counteract any tendency of the rubber to lose its effective gripping action due to usage or other deteriorating situations.

Reference should be had to the accompanying drawings forming a portion of this specification in which.

Figure 1:
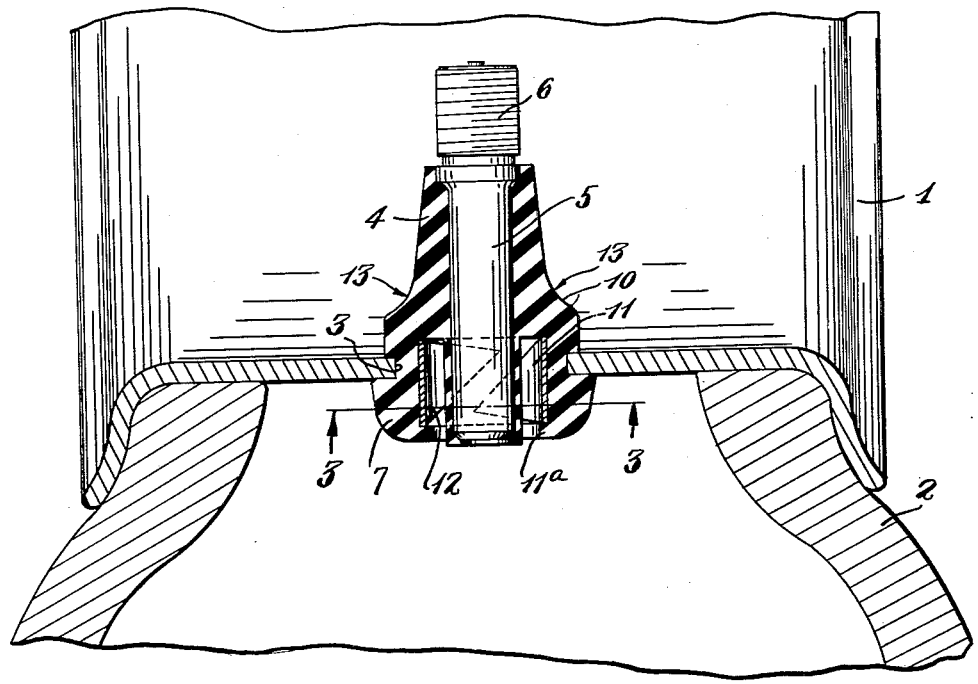
Fig. 1 is a sectional elevation showing a portion of a rim, a so-called tubeless tire mounted thereon and a valve stem of the present invention occupying the valve stem opening in the rim.

Referring to the drawings, 1 indicates a portion of a rim intended for the mounting of a tubeless tire, a portion of which is indicated at 2. This rim is provided with an opening, as indicated at 3 in Fig. 2, intended for the reception of a valve stem.

The valve stem of the present invention comprises a body 4, of rubber or of equivalent flexible or elastic material. This rubber body enfolds a hollow metal insert 5, which is cylindrical in nature and extends from one end to the other end of the rubber body. The insert 5 is secured in the body 4 by means known in the art, so that the rubber is in effect bonded to the metal and insuring against the leakage of air between the metal insert and the rubber body which surrounds it.

Although not shown, it will be understood that the interior of the metal insert is formed to receive a valve insides such as is commonly known and used in this art. The outer end of the member 5 may be threaded, as indicated at 6, to receive a valve cap which is well-known in the industry and does not need to be illustrated.

The rubber body has what might be called a bulbous portion, as indicated at 7, at the lower or inner end thereof and there is formed in this bulbous portion a groove 8. The lower portion of this groove is slightly dished, as indicated at 9, so as to give better gripping properties when the stem is inserted in the opening of the rim, as will be later pointed out.

It should be noted that the valve stem opening in the rim has, through the years, become standardized as to size and this invention is described with the intention that the valve stem shall be used in connection with a rim which has a standard size opening.

The rubber body 4, at its upper portion, is somewhat conically formed and is curved outwardly, as indicated at 10.

Figure 2:
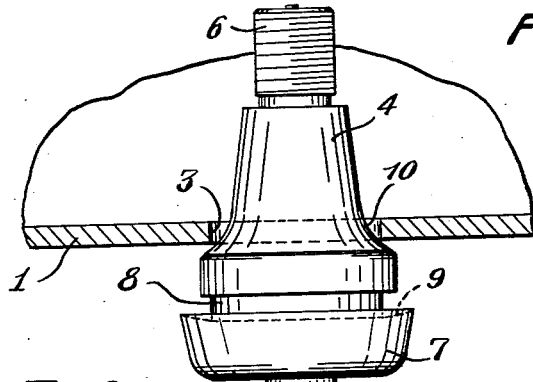
Fig. 2 shows a portion of the rim with the valve stem opening and the valve stem being introduced into the said opening.
Figure 3:
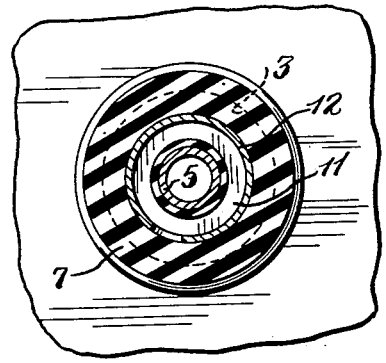
Fig. 3 is a section upon the line 3—3 of Fig. 1.

In mounting the valve stem with respect to the rim, the valve stem is applied, before the tire is mounted, upon the rim and is introduced into the opening in the rim in the manner indicated in Fig. 2. By giving this body portion 4 a sharp pull the rubber is compressed and slips through the opening 3 so that groove 9 comes into contact with the periphery of the opening in the rim 1; it, so to speak, snaps into position and the resiliency of the rubber will naturally tend to exert itself to maintain the valve stem in its position in the valve stem opening of the rim. Due to the dished formation 9, as shown in Fig. 2, and as before explained, when that portion of the stem comes into contact with the inner side of the rim, it is flattened which tends to make its gripping action with respect to the metal in the area of the periphery of the valve stem hole more binding.

Within the lower portion of the stem 4, or that which has been described as the bulbous portion, there is a chamber which is indicated at 11. This chamber being an open chamber and provided with an inturned lip 11ª at the lower end thereof. The height of the chamber is such that it will, so to speak, extend above the annular groove 8 which is formed in the lower part of the stem 4.

Figure 4:
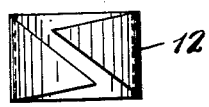
Fig. 4 is an elevation of the expansible spring member which forms a part of the valve stem structure.

Within this chamber there is a spring 12 and is more particularly shown in Fig. 4. This spring is preferably of a height to extend to the top of the chamber 11 and to be in engagement with the lower portion, or lip 11ª. The spring is under compression when introduced into the chamber so that it exerts an outward expansive force pressing against the entire wall of the chamber 11 and reinforcing the gripping action between the stem and particularly the groove 8 with respect to the periphery of the opening 3 in the rim 1.

This spring not only serves to increase the effective sealing action between the rubber stem and the valve stem opening 3, but as the valve stem is subject to wear and the effect of the weather etc., this spring will continue its effective pressure so that such deterioration in the rubber itself will not be effected to lessen or detract from the sealing qualities of the rubber stem with respect to the valve stem and its mounting in the rim. The expansive action of the spring compresses the rubber against the metal edge of the valve stem opening in the rim, thus to augment the attachment of the stem to the rim.

A further feature of the valve stem which we have described resides in the fact that the insert 5 which is of metal and tubular, extends throughout the body of the valve stem 4 and at its lower portion is free in the sense that it is not encased in any rubber body. Therefore, if the valve stem 4 be either purposely or accidently struck or impacted by some instrument or object, the stem will be flexible in the region indicated at 13, and that is where any bending action will take place because the upper part of the insert is tightly bound to the rubber of the stem, but the lowermost portion of the insert is not so held and hence flexing movement will take place principally at the parts marked 13. This portion of the stem which will thus be flexed is above the portion of the stem which is in engagement with the periphery and the contiguous parts of the valve stem opening in the rim 1.

We have described the best form in which the invention is now and appears to be presented, but modifications may be made without in any way departing from the spirit of this invention, except as the same may be set forth in the claims.

Having thus described my invention, I claim:

1. A valve stem for mounting upon a standard rim adapted to mount a tubeless tire, said valve stem comprising a rubber body portion having a central axial opening, a hollow cylindrical insert extending through the said opening and being bonded to the rubber stem, said insert being adapted to interiorly mount a valve insides, the said body of the stem being provided with a chambered portion adjacent an end thereof of greater diameter than the central axial opening and said body also being provided upon the outer surface, but adjacent to the chambered portion, with a groove which is adapted to engage with the valve stem opening in a rim, a spring means within the said chamber, said spring means being biased to produce an outward pressure against the wall of said chamber.

2. A valve stem for mounting upon a standard rim adapted to mount a tubeless tire, said valve stem comprising a rubber body, the said body being provided with an enlarged chamber at one end thereof, the rubber body being provided with a central axial opening, a hollow cylindrical insert extending through the said opening and being bonded to the rubber stem, the said insert extending through the aforeseaid chamber formed in the rubber body, the said rubber body upon the exterior surface thereof having a groove adapted to engage with the periphery of a valve stem opening of a standard rim, a spring means located in said chamber, said spring means engaging the side wall of the chamber and expansively bearing against the said wall.

3. A valve stem for mounting upon a standard rim adapted to mount a tubeless tire, said valve stem comprising a rubber body portion having a central axial opening, the said body of the stem being provided with a chambered portion adjacent one end thereof, a hollow cylindrical insert extending through the aforesaid axial opening and being bonded to the rubber of the stem, the said insert extending through the aforementioned chambered portion and being unattached in the region of the said chambered portion, the wall of the said rubber body being conically shaped and at the base of the conical portion being of such thickness as to permit flexibility of the outer portion of the stem when the stem is mounted in a rim, the body portion being provided with an external groove which is adapted to engage with the periphery of the opening in a rim, and a spring biased to be expanded, which spring is located within the said chamber and engages with the peripheral wall of the chamber with an expansive action.

References Cited in the file of this patent

UNITED STATES PATENTS

| | | |
|---|---|---|
| 2,049,252 | Eberhard | July 28, 1936 |
| 2,308,952 | Ickes | Jan. 19, 1943 |
| 2,310,877 | Sperry | Feb. 9, 1943 |
| 2,634,785 | Tubbs | Apr. 14, 1953 |